(12) United States Patent
Gripp et al.

(10) Patent No.: US 7,171,117 B1
(45) Date of Patent: Jan. 30, 2007

(54) OPTICAL ROUTER

(75) Inventors: Jurgen Gripp, Cranford, NJ (US); Martin Zirngibl, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1261 days.

(21) Appl. No.: 09/648,822

(22) Filed: Aug. 25, 2000

(51) Int. Cl.
*H04J 14/00* (2006.01)

(52) U.S. Cl. .............................. 398/49; 398/48; 398/57

(58) Field of Classification Search ................. 398/49, 398/48, 128, 57
See application file for complete search history.

(56) References Cited

U.S. PATENT DOCUMENTS

| 5,002,350 | A | | 3/1991 | Dragone ................... 350/96.15 |
|---|---|---|---|---|
| 5,136,671 | A | | 8/1992 | Dragone ....................... 385/46 |
| 5,351,146 | A | * | 9/1994 | Chan et al. ................... 398/58 |
| 5,412,744 | A | | 5/1995 | Dragone ....................... 385/24 |
| 5,455,699 | A | * | 10/1995 | Glance et al. ................. 398/51 |
| 5,521,734 | A | | 5/1996 | Frigo ........................... 359/152 |
| 5,610,744 | A | * | 3/1997 | Ho et al. ....................... 398/58 |
| 5,623,356 | A | * | 4/1997 | Kaminow et al. ............. 398/46 |
| 5,636,210 | A | | 6/1997 | Agrawal ....................... 370/390 |
| 5,712,932 | A | * | 1/1998 | Alexander et al. ............ 385/24 |
| 5,745,612 | A | * | 4/1998 | Wang et al. .................. 385/24 |
| 5,786,923 | A | | 7/1998 | Doucet et al. ............... 359/172 |
| 5,808,764 | A | | 9/1998 | Frigo et al. .................. 359/127 |
| 5,870,216 | A | * | 2/1999 | Brock et al. ................... 398/49 |
| 5,892,604 | A | | 4/1999 | Yamanaka et al. ........... 359/128 |
| 5,920,663 | A | | 7/1999 | Dragone ....................... 385/15 |
| 5,973,809 | A | * | 10/1999 | Okayama ...................... 398/48 |
| 6,034,799 | A | | 3/2000 | Hansen ........................ 359/124 |
| 6,049,640 | A | | 4/2000 | Doerr ........................... 385/15 |
| 6,058,233 | A | | 5/2000 | Dragone ....................... 385/46 |
| 6,067,389 | A | | 5/2000 | Fatehi et al. .................. 385/17 |
| 6,288,808 | B1 | * | 9/2001 | Lee et al. ..................... 398/49 |
| 6,594,049 | B1 | * | 7/2003 | Brinkman et al. ............ 385/24 |

FOREIGN PATENT DOCUMENTS

EP 0982 970 A2 8/1999

OTHER PUBLICATIONS

Sasayama K: "Multihop Frontiernet using generalised perfect shuffle interconnection topology", Electronics Letters, IEE Stevenage, GB, vol. 31, No. 13, Jun. 22, 1995, pp. 1087-1088, XP006002990, ISSN: 0013-5194 * the whole document *.
Yamanaka N: "Breakthrough Technologies for the High-Performance Electrical ATM Switching System", Journal of Lightwave Technology, IEEE. New York, US, vol. 16, No. 12, Dec. 1998, pp. 2181-2190, XP000833962, ISSN: 0733-8724 *figures 8, 13 *.
European Search Report dated Jul. 13, 2001 for Application No. 01301961.7-2209.
S. Yasukawa, "High-Speed Multi-Stage ATM Switch Based on Hierarchial Cell Resequencing Architecture and WDM Interconnection", IEICE Trans. Commun. vol. E82 B. No. 2, Feb. 1999, pp. 271-280.

* cited by examiner

*Primary Examiner*—David C. Payne

(57) ABSTRACT

An optical router is disclosed having at least one frequency router. The frequency router includes a plurality of input ports and a plurality of output ports. At least one input port simultaneously receives at least two optical signals to be frequency routed, while at least one output port simultaneously presents at least two frequency routed optical signals. Each optical signal to be frequency routed is colored in response to destination information.

27 Claims, 6 Drawing Sheets

OPTICAL ROUTER

CROSS-REFERENCE TO RELATED APPLICATIONS

Related subject matter is disclosed in co-pending, commonly assigned, U.S. patent application Ser. No. 09/430,318, filed on Oct. 29, 1999.

FIELD OF THE INVENTION

The present invention relates to communications, generally, and more particularly to an optical router well suited for Internet Protocol ("IP") traffic.

BACKGROUND OF THE INVENTION

The rapid growth of Internet traffic has created an increasing need for more responsive inter-networking components. One component approaching its operative limits is the IP router. IP routers route packets of data traffic between destinations in an inter-network.

Presently, IP routers are electronic switch based devices. To date, electronic switch based IP routers having 16 input and 16 output channels are commercially available. Extending the number of input and output channels, however, has raised substantial challenges due to the space management issues, power and heat dissipation, as well as electromagnetic interference. It is believed that given their limited number of input and output channels, electronic switch based IP routers may very shortly reach their capacity to route inter-network traffic. As a result, optically based components, including IP routers, are being explored by industry. It is estimated that optical IP routers may soon be realized having 128 input and 128 output channels, and thus, greater overall throughput.

In view of the above, a demand exists for an optical IP router offering an increased number of input and output channels, and greater overall throughput.

SUMMARY OF THE INVENTION

In co-pending, commonly assigned, U.S. Patent application of Brinkman et al., Ser. No. 09/430,318, filed on Oct. 29, 1999, an optical router is described for routing signals by determining an intended destination for a packet to be routed, appropriately "coloring" the packet according to a selected wavelength in a destination-specific manner, and then transmitting the colored packet through an optical frequency router. By this arrangement, the colored packet of data is routed to a desired destination.

We have invented an optical router having increased throughput over the hereinabove referenced U.S. patent application. Our optical router employs an optical frequency router for simultaneously receiving at least two signals which are differently "colored"—having different wavelengths—in one input port. The optical frequency router also simultaneously presents at least two routed signals which are differently "colored"—having different wavelengths—at one output port. By this arrangement, a number of colored packets of data may be simultaneously routed to each of their desired destinations through one port.

In an illustrative embodiment of the present invention, an optical router is disclosed. The optical router comprises a plurality of combiners, a plurality of receivers, and at least one optical frequency router for routing optical signals by their color. To increase the number of input and output channels of the optical router, at least one input port of the frequency router is coupled with one combiner for combining optical signals of different colors, while at least one output port of the optical frequency router is coupled with one receiver for separating and directing at least two frequency routed optical signals to their intended destinations.

These and other embodiments, advantages and objects will become apparent to skilled artisans from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific parameters or the structural details of the invention, which can be determined by one skilled in the art by examination of the information herein.

DETAILED DESCRIPTION OF THE PRESENT INVENTION

Figure 1:
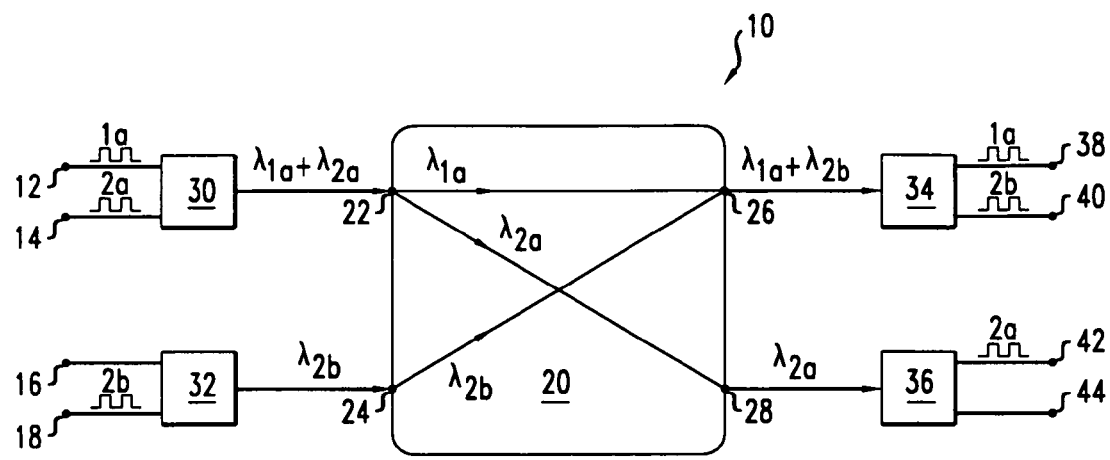
FIG. 1 illustrates a first embodiment of the present invention.

Referring to FIG. 1, an optical router 10 is illustrated according to a first embodiment of the present invention. Optical router 10 routes signals from a plurality of router input channels, 12, 14, 16 and 18, to a plurality of router output channels, 38, 40, 42 and 44. Router input channels, 12, 14, 16 and 18 each receive a signal to be routed. In an embodiment of the present invention, each signal to be routed is a packet of data employing an Internet Protocol ("IP") format, for example—other formats and standards, however, may also be used. Each IP packet of data has its intended destination residing therein, as will be better understood from the disclosure hereinbelow in association with FIG. 7.

Optical router 10 comprises an optical frequency router 20. Optical frequency router 20 routes optical signals in response to their wavelength or color, as will be better understood from the disclosure hereinbelow in association with FIG. 8. Frequency router 20 has a plurality of input ports, 22 and 24, and a plurality of output ports, 26 and 28.

Optical router 10 also comprises a pair of input devices, 30 and 32. Input devices, 30 and 32, convert received packets of data into corresponding optical signals. Each optical signal, as converted, is "colored" in response to the intended destination information of the respective packet of data. The resultant optical signal, as colored, has a wavelength corresponding with an intended output port, 26 or 28, to which it is to be routed to by frequency router 20.

Each input port, 22 and 24, of frequency router 20 is respectively coupled with an input device, 30 and 32. Likewise, each input device, 30 and 32, is coupled with a group of router input channels, 12 and 14, and, 16 and 18, respectively. Each input device, 30 and 32, may simultaneously receive more than one incoming packet of data from its respective router input channels. Consequently, each input device, 30 and 32, may combine more than one optical signal if they are of different wavelengths or colors.

Optical router 10 comprises a centralized scheduler (not shown) for scheduling the conversion of each received packet of data into an optical signal. The scheduler enables the coloring of each optical signal in response to the intended destination information of the corresponding packet of data, to avert overlap of optical signals having the same color, also referred to as collisions. In scheduling the conversion of packets of data, the scheduler may delay one packet of data relative to another if both are to be routed to the identical router output channel. Likewise, the scheduler may delay one packet relative to another if both are received by the same input device and are to be routed through the same output port of frequency router 20 to different destinations.

In the illustrative embodiment, a number of packets of data, $1_a$ and $2_a$, are simultaneously received by input device 30, while a packet of data $2_b$ is received by input device 32. Each respective input device, 30 and 32, converts these packets of data into corresponding optical signals, $\lambda_{1a}$, $\mu_{2a}$ and $\lambda_{2b}$—each of which are colored in response to their destination. Input device 30, receiving packets of data, $1_a$ and $2_a$, combines the converted optical signals, $\lambda_{1a}$ and $\lambda_{2a}$, into a combined optical signal having two component signals. As a result, input port 22 simultaneously receives the combined optical signal. Likewise, input port 24 receives the converted optical signal $\lambda_{2b}$. Given its physical properties, frequency router 20 routes optical signals $\lambda_{1a}$ and $\lambda_{2a}$ from input port 22 to outputs ports 26 and 28, respectively, and optical signal $\lambda_{2b}$ from input port 24 to output port 26.

Coupled with each output port, 26 and 28, is a receiver, 34 and 36. Each receiver, 34 and 36, is also coupled with a group of router output channels, 38 and 40, and, 42 and 44, respectively. Each receiver, 34 and 36, is capable of separating routed optical signal components combined by frequency router 20 at its respective output port. Each receiver, 34 and 36, also presents—or, in other words, directs—each routed optical signal component to its respective intended destination. In the illustrative embodiment, receiver 34 simultaneously receives optical signals, $\lambda_{1a}$ and $\lambda_{2b}$, from output port 26, while receiver 36 receives optical signal $\lambda_{2a}$ from output port 28. Consequently, receiver 34 presents optical signals, $\lambda_{1a}$ and $\lambda_{2b}$, to router output channels 38 and 40, respectively, and receiver 36 presents optical signals, $\lambda_{2a}$, to router output channel 42. Moreover, each receiver, 34 and 36, also converts each received optical signal, $\lambda_{1a}$, $\lambda_{2a}$ and $\mu_{2b}$, back into packets of data, $1_a$, $2_a$, and $2_b$, in the electrical domain.

Frequency router 20 comprises N input ports and N output ports, where N is equal to two (2) in the illustrative embodiment. Each input port of frequency router 20 is also capable of simultaneously receiving, N, or two (2) optical signals from a respective input device, while each output port is capable of simultaneously presenting, N, or two (2), optical signals to a respective receiver.

Consequently, optical router 10 has N×N router input channels and N×N router output channels.

Figure 2:
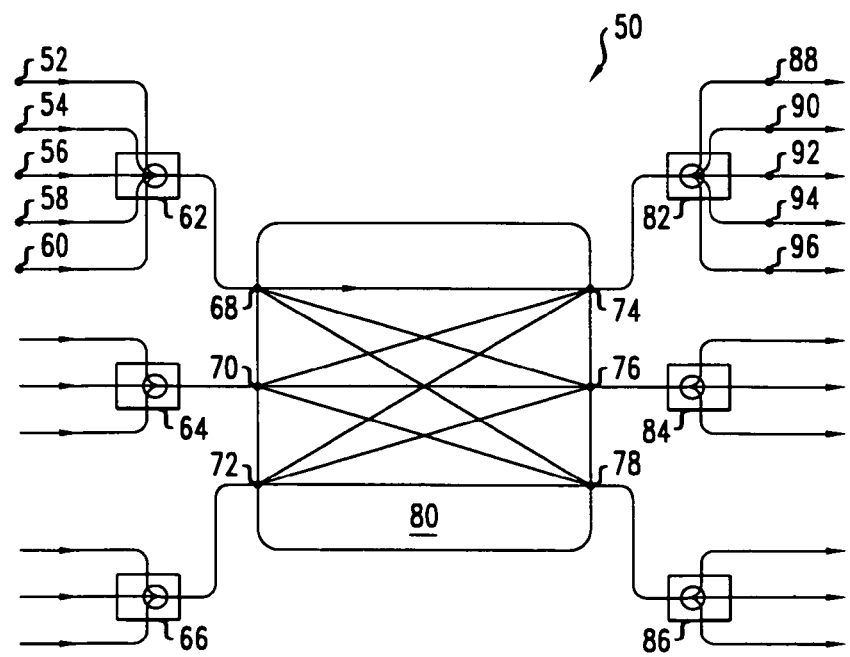
FIG. 2 illustrates a second embodiment of the present invention.

Referring to FIG. 2, an optical router 50 is illustrated according to a second embodiment of the present invention. While employing the same operational principles as optical router 10 of FIG. 1, the architecture of optical router 50 supports greater than N×N router input channels and N×N router output channels. Optical router 50 comprises an optical frequency router 80 having N input ports, 68, 70 and 72, and N output ports, 74, 76 and 78, where N is equal to three (3).

In the illustrative embodiment, input port 68 is capable of simultaneously receiving M, or five (5), optical signals from an input device 62 through router input channels 52, 54, 56, 58 and 60. Likewise, output port 74 is capable of simultaneously presenting M, or five (5), optical signals to a receiver 82, and, thus, router output channels 88, 90, 92, 94 and 96. If the number of optical signals received by an input port exceeds the number of output ports, frequency router 80 routes two or more of these optical signals to the same output port. A data collision, however, may be avoided if these routed signals have different colors (wavelengths) and the ratio of their wavelengths satisfies the modal properties of frequency router 80, as will be better understood from the disclosure hereinbelow in association with FIG. 8.

It should be apparent to skilled artisans from the hereinabove disclosure that input ports 70 and 72 may each also simultaneously receive M optical signals through input devices, 64 and 66, respectively, while output ports 76 and 78 may each also simultaneously present to their respective receivers, 84 and 86, M optical signals. Here, optical router 50 will have N×M router input channels and N×M router output channels. To effectively increase the number of input and output channels of optical router 50 with respect to optical router 10 of FIG. 1, M should be greater than N. The maximum number of input and output channels available to optical router 50 is primarily limited by the material properties of frequency router 80.

Figure 3:
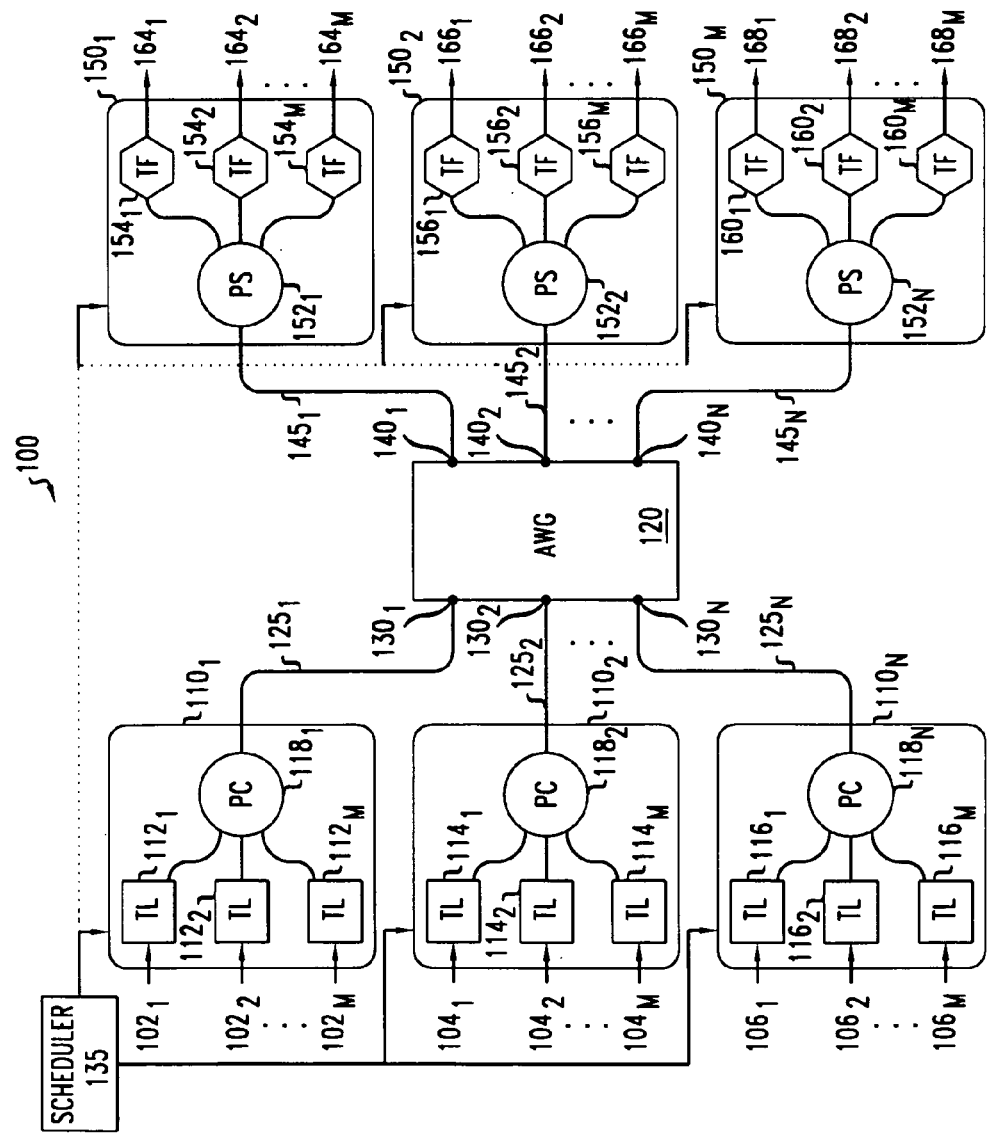
FIG. 3 illustrates a third embodiment of the present invention.

Referring to FIG. 3, an optical IP router 100 is illustrated according to a third embodiment of the present invention. Optical IP router 100 routes signals from a number of router input channels, $102_1$–$102_M$, $104_1$–$104_M$, and $106_1$–$106_M$, to a number of router output channels, $164_1$–$164_M$, $166_1$–$166_M$, and $168_1$–$168_M$. Router input channels, $102_1$–$102_M$, $104_1$–$104_M$, and $106_1$–$106_M$, each may receive an IP packet of data having its intended destination residing therein.

Optical router 100 comprises an optical frequency router 120 for routing optical signals in response to their wavelength or color. Optical router 100 also comprises a plurality of input devices, $110_1$–$110_N$. Each input device converts a number of received IP packets of data from a corresponding number of router input channels into a number of colored optical signals. Each optical signal, as converted, may be "colored" in response to the intended destination information of the respective packet of data.

To effectively convert each received IP packet of data, each input device comprises a number of converters, $112_1$–$112_M$, $114_1$–$114_M$ and $116_1$–$116_M$, each corresponding with a router input channel, $102_1$–$102_M$, $104_1$–$104_M$, and $106_1$–$106_M$. Each converter comprises a tunable laser ("TL") for generating a carrier monochromatic light beam having a particular wavelength or color selected in response to a received packet of data and controlled by a centralized scheduler 135, as will be better understood from the disclosure hereinbelow in association with FIG. 7. The carrier light beam is subsequently modulated by a modulator in response the received packet of data, resulting in an optical data signal having a color corresponding with the intended destination of received packet of data.

Each input device, $110_1$–$110_N$, also comprises an optical power combiner, $118_1$–$118_N$. Each combiner, $118_1$–$118_N$, is coupled with a number of corresponding converters, $112_1$–$112_M$, $114_1$–$114_M$ and $116_1$–$116_M$, associated with a respective input device; $110_1$–$110_N$. Each combiner combines simultaneously received optical signals, as colored. Consequently, a plurality of combined optical signals, $125_1$–$125_N$, are output from each corresponding input device. It should be noted that scheduler 135 prevents each combiner from combining more than one optical signal of the same color.

Frequency router 120 comprises a plurality of input ports, $130_1$–$130_N$, and a plurality of output ports, $140_1$–$140_N$. Coupled with an input device, each input port may receive a combined optical signal. Frequency router 120 routes each component optical signal within a combined optical signal to an output port in response to the color of the respective signal. Thus, for example, if combined optical signal, $125_1$, comprising component optical signals from converted packets of data of each router input channel, $102_1$–$102_M$, is received by input port $130_1$, frequency router 120 routes each component optical signal to one output port. If input ports $130_2$–$130_N$ also receive combined optical signals, a number of routed optical signals may also be simultaneously presented to a number of output ports. Given the characteristics of frequency router 120, the routed optical signals presented at an exemplary output port, $140_1$, will have different colors. Therefore, each output port may present a resultant optical signal, $145_1$–$145_N$, comprising a number of component routed optical signals therein.

IP router 100 also comprises a plurality of output receivers, $150_1$–$150_N$. Each receiver is coupled with an output port of frequency router 120 for receiving a resultant optical signal, $145_1$–$145_N$. Each receiver, $150_1$–$150_N$, comprises an optical power splitter, $152_1$–$152_N$. Each splitter, $152_1$–$152_N$, is coupled with a number of corresponding tunable filters ("TF"), $154_1$–$154_M$, $156_1$–$156_M$ and $160_1$–$160_M$, associated with a respective receiver, $150_1$–$150_N$. Each splitter splits or divides the optical power of a corresponding resultant optical signal, $145_1$–$145_N$, amongst its respective tunable filters.

By this arrangement, each tunable filter may receive a power divided representation of a resultant optical signal, $145_1$–$145_N$. At least one tunable filter of the corresponding receiver is tuned to the color of a component optical signal of the resultant optical signal, through scheduler 135, in response to the intended destination of an original packet of data. The tuning of the tunable filter enables each component optical signal within a resultant optical signal to pass to its intended destination.

It should be noted that optical IP router 100 prevents the simultaneously routing of more than one IP packet of data received by one input device, $110_1$–$110_N$, to one output receiver, $150_1$–$150_N$. This limitation is based on the fact that both IP packets of data would require the same coloring to be routed to the same output receiver. To avert a data collision, in one embodiment, scheduler 135 introduces a delay between such IP packets of data. However, this potential limitation also enables optical IP router 100 to route one packet of data from one router input channel associated with one input device to any number of router output channels associated with one output receiver by setting some or all of the corresponding tunable filters to the same color. This routing feature, also referred to as partial multicasting, allows optical IP router 100 to route, for example, one packet of data from router input channel $102_2$ to router output channels $166_1$–$166_M$.

Figure 4:
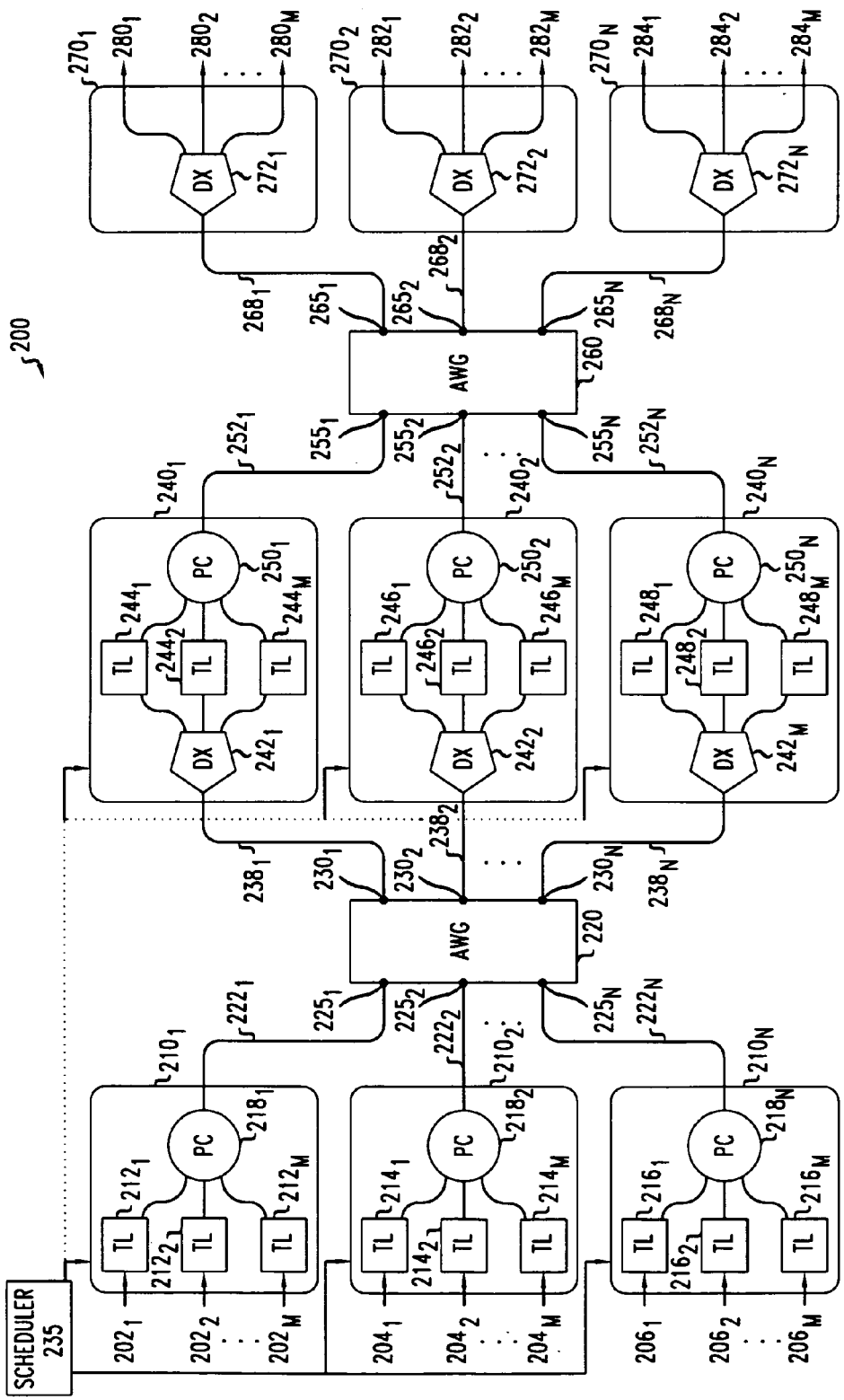
FIG. 4 illustrates a fourth embodiment of the present invention.

Referring to FIG. 4, an optical IP router 200 is illustrated according to a fourth embodiment of the present invention. Optical router 200 operates similarly to optical IP router 100 of FIG. 3. However, optical router 200 employs a two stage routing architecture to replace tunable filters, $154_1$–$154_M$, $156_1$–$156_M$ and $160_1$–$160_M$.

The two stage architecture of optical router 200 comprises a first and a second stage optical frequency router, 220 and 260, for routing packets of data from a number of router input channels, $202_1$–$202_M$, $204_1$–$204_M$, and $206_1$–$206_M$, to a number of router output channels, $280_1$–$280_M$, $282_1$–$282_M$, and $284_1$–$284_M$. Optical router 200 comprises a plurality of first stage input devices, $210_1$–$210_N$. Each input device, $210_1$–$210_N$, much like the input devices, $110_1$–$110_N$, of FIG. 3, comprises a number of converters, $212_1$–$212_M$, $214_1$–$214_M$ and $216_1$–$216_M$. Each converter comprises a tunable laser ("TL") for converting a received IP packet of data into an optical signal colored in response to its intended destination. Each input device also comprises a combiner, $218_1$–$218_N$, for combining the colored optical signals into a combined optical signal of a number of colors, and a scheduler 235 for preventing more than one optical signal of the same color from being combined. A combined optical signal, $222_1$–$222_N$, may be generated by each corresponding input device.

First stage frequency router 220 comprises a plurality of input ports, $225_1$–$225_N$, and a plurality of output ports, $230_1$–$230_N$. Each input port is associated with one input device to receive one combined optical signal, $222_1$–$222_N$. First stage frequency router 220 routes each optical signal component within a combined optical signal to an output port in response to its color. As such, each output port may have a resultant optical signal, $238_1$–$238_N$, comprising a number of simultaneously presented routed optical signals each having a different color.

Optical router 200 also comprises a plurality of second stage input devices, $240_1$–$240_N$, each for coupling an output port of first stage frequency router 220 with an input port, $255_1$–$255_N$, of second stage frequency router 260. Each second stage input device, $240_1$–$240_N$, comprises a second stage demultiplexer, $242_1$–$242_N$, for demultiplexing a resultant optical signal, $238_1$–$238_N$, into a number of component, once routed, optical signals. Each second stage input device also comprises a number of second stage converters, $244_1$–$244_M$, $246_1$–$246_M$, and $248_1$–$248_M$, and a second stage combiner, $250_1$–$250_N$, resulting in combined second stage optical signals, $252_1$–$252_N$. By this arrangement, each once routed optical signal component is directed to a specific second stage converter in response to its color. Each second stage converter, in response to the intended destination of the original packet of data, re-colors the received once routed optical signal component, to form a second stage optical signal.

It should be noted that each second stage converter converts a received demultiplexed routed optical signal into an electrical signal. Each second stage converter recreates the once routed optical signal component as a second stage optical signal from the electrical representation created. In response to the intended destination of the original received packet of data, the second stage optical signal is colored, as controlled by scheduler 235.

Scheduler 235 may be realized using a centralized design. Alternatively, scheduler 235 may comprise a number of independent schedulers. Here, each input device, $210_1$–$210_N$, and each second stage input device, $240_1$–$240_N$, has an associated independent scheduler. Each independent scheduler controls the routing of packets of data corresponding with its associated input device. As a consequence, each independent scheduler need not interact with any other independent scheduler, thereby simplifying the scheduling computations associated with a centralized scheme.

Each input port, $255_1$–$255_N$, may receive one combined second stage optical signal, $252_1$–$252_N$. Second stage frequency router 260 routes each component of the combined second stage optical signals, $252_1$–$252_N$, as received by an associated input port, according to their color. As such, each second stage routed optical signal, $268_1$–$268_N$, comprises routed components of different second stage optical signals, $252_1$–$252_N$. The resultant routed optical signals, $268_1$–$268_N$, are presented by each output port, $261_1$–$265_N$, to a corresponding output stage receiver, $270_1$–$270_N$.

Each output stage receiver, $270_1$–$270_N$, comprises an output stage demultiplexer, $272_1$–$272_N$, for demultiplexing one resultant routed optical signal, $268_1$–$268_N$. Each resultant routed optical signal, $268_1$–$268_N$, may have a number of component optical signals therein. As such, each component of the resultant routed optical signals is directed to a particular router output channel, $280_1$–$280_M$, $282_1$–$282_M$, and $284_1$–$284_M$, and thus, presented to the intended destination of the original packet of data.

Figure 5:
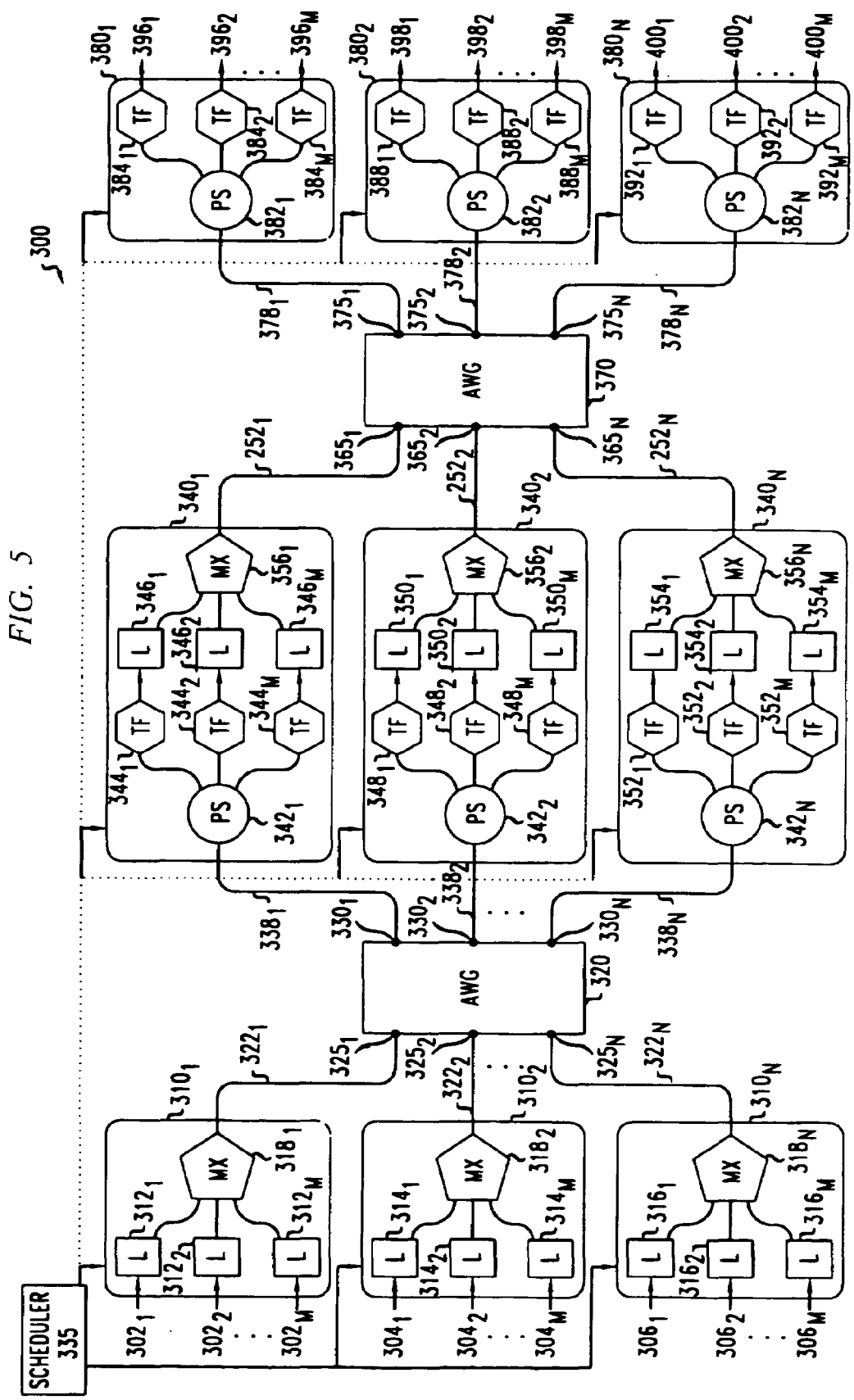
FIG. 5 illustrates a fifth embodiment of the present invention.

Referring to FIG. 5, an optical IP router 300 is illustrated according to a fifth embodiment of the present invention. Optical router 300 operates similarly to optical IP router 200 of FIG. 4. However, optical router 300 enables one packet of data received by any one router input channel to be to be simultaneously routed to any number of router output broadcasting channels. This feature is defined as full multicasting or router broadcasting.

To realize this full multicasting feature, optical router 300 comprises a first and a second stage optical frequency router, 320 and 370, for routing packets of data, between a number of router input channels, $302_1$–$302_N$, $304_1$–$304_N$, and $306_1$–$306_N$, and a number of router output channels, $396_1$–$396_M$, $398_1$–$398_M$, and $400_1$–$400_M$. Optical router 300 comprises a plurality of first stage input devices, $310_1$–$310_N$. Each input device, $310_1$–$310_N$, comprises a number of fixed lasers ("FL"), $312_1$–$312_M$, $314_1$–$314_M$, and $316_1$–$316_M$, for converting a received IP packet of data into an optical signal.

Unlike the previous embodiments, each optical signal may be colored in response to which fixed laser, and thus which router input channel, receives the IP packet of data. For example, each packet of data received by router input channel, 3022, and fixed laser $312_1$, should be similarly colored. Each input device, $310_1$–$310_N$, also comprises a multiplexer, $318_1$–$318_N$, for multiplexing, or in other words, combining each of the optical signals received from the corresponding fixed lasers, and for generating a multiplexed or combined optical signal, $322_1$–$322_N$.

First stage frequency router, 320, comprises a plurality of input ports, $325_1$–$325_N$, each for receiving a multiplexed optical signal, $322_1$–$322_N$, from an input device. Frequency router, 320, routes each component optical signal of the received multiplexed signals, $322_1$–$322_N$, according to its color. Frequency router, 320, at each output port, $325_1$–$325_N$, presents a resultant routed optical signal, $338_1$–$338_N$, each of which may comprise routed components of other multiplexed signals, $322_1$–$322_N$.

Each output port, $330_1$–$330_N$, is coupled with a second stage receiver, $340_1$–$340_N$. Each second stage receiver comprises an optical power splitter, $342_1$–$342_N$, for splitting one received resultant routed optical signal from the corresponding output port amongst a number of tunable filters ("TF"), $344_1$–$344_M$, $348_1$–$348_M$, and $352_1$–$352_M$. Each tunable filter receives a power divided representation of a resultant routed optical signal, $338_1$–$338_N$, and may be tuned to the color of a component optical signal in response to the intended destination of an original packet of data by a centralized scheduler 335. Each tunable filter may pass a component optical signal from resultant routed optical signal, $338_1$–$338_N$, to a corresponding fixed laser, $346_1$–$346_M$, $350_1$–$350_M$, $354_1$–$354_M$. Each fixed laser converts or re-colors a component optical signal, as passed by a corresponding tuned filer. Here, the resultant optical signal may be colored according to which fixed laser receives the component optical signal. For example, each component optical signal passed by tunable filter 3442 to fixed laser $346_2$ will be colored identically.

Each output device, $340_1$–$340_N$, also comprises a multiplexer, $356_1$–$356_N$, for multiplexing each of the optical signals received from the corresponding second stage fixed lasers, and for generating a second stage multiplexed optical signal, $358_1$–$358_N$. Further, each second stage multiplexed optical signal is received by one input port, $365_1$–$365_N$, of second stage frequency router, 370. Frequency router, 370, routes each component optical signal of the received second stage multiplexed signals, $358_1$–$358_N$, according to its color. Frequency router, 370, at each output port, $375_1$–$375_N$, presents a final stage optical signal, $378_1$–$378_N$. Each final stage optical signal may comprise routed components from other second stage multiplexed signals, $358_1$–$358_N$.

Each output port, $375_1$–$375_N$, is coupled with an output stage receiver, $380_1$–$380_N$. Each output stage receiver comprises a power splitter, $382_1$–$382_N$, for splitting a final stage optical signal, $378_1$–$378_N$, as received from the corresponding output port, amongst a number of associated output stage tunable filters, $384_1$–$384_M$, $388_1$–$388_M$, and $392_1$–$392_M$. Each tunable filter receives a power divided representation of a final stage optical signal, $378_1$–$378_N$. One or more tunable filters may be tuned to the color of a component optical signal, though a scheduler 335, in response to the intended destination of an original packet of data. Consequently, the passed optical signal may be effectively routed to its intended destination via router output channels, $396_1$–$396_M$, $398_1$–$398_M$, and $400_1$–$400_M$.

Figure 6:
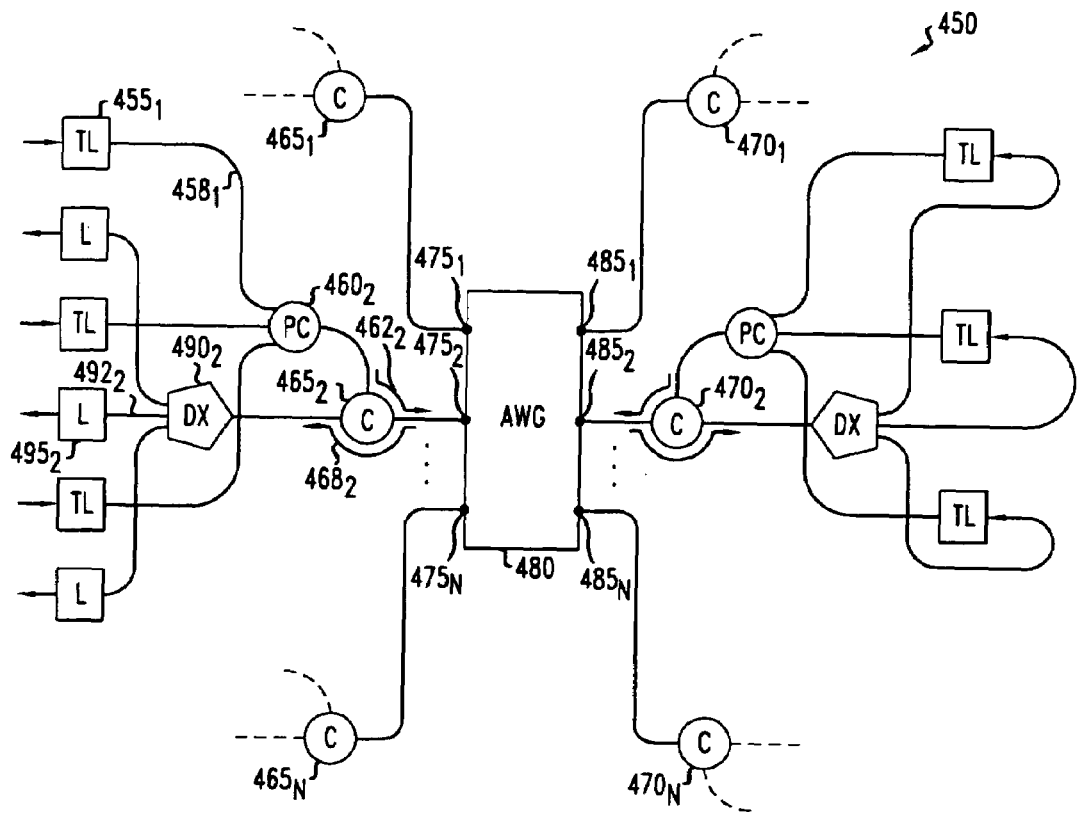
FIG. 6 illustrates a sixth embodiment of the present invention.

Referring to FIG. 6, an optical IP router 450 is illustrated according to a sixth embodiment of the present invention. Optical IP router 450 is an alternative configuration of optical IP router 200 of FIG. 4, employing one optical frequency router 480. It should be noted that optical IP router 300 of FIG. 5 may also be modified in accordance with the configuration of optical IP router 450.

Frequency router 480 comprises a number of ports, $475_1$–$475_N$ and $485_1$–$485_N$, each of which function in a dual role: (1) for receiving combined optical signals from a number of tunable lasers; and (2) for presenting a routed optical signal comprising a number of differently colored optical signals. Moreover, frequency router 480 employs a number of circulators, $465_1$–$465_N$ and $470_1$–$470_N$, each of which coupled with one port. Known to skilled artisans, optical circulators functionally separate optical signals propagating in different directions. Each circulator enables a combined optical signal and a routed optical signal having various component signals to propagate through the same port, unobstructed.

For example, a packet of data is received by a converter, $455_1$, to produce an optical signal, $458_1$, colored in response to its destination. Optical signal, $458_1$, is received by combiner $460_2$, where it may be combined with other optical signals, resulting in a combined optical signal $462_2$. Circulator $465_2$ allows combined optical signal $462_2$ to propagate to port $475_2$, while a routed optical signal, $468_2$, is presented to circulator $465_2$ from port $475_2$. Routed optical signal, $468_2$, is directed by circulator $465_2$ to a demultiplexer, $490_2$, for example, and directed to a number of light detecting devices, including device $495_2$.

Figure 7:
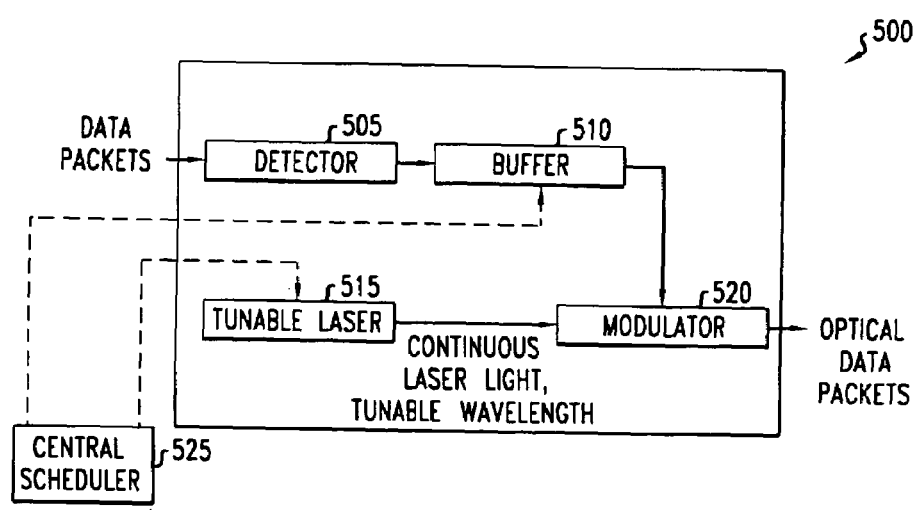
FIG. 7 illustrates a converter according to an embodiment of the present invention.

Referring to FIG. 7, a converter 500 is illustrated as may be employed in the present invention. Converter 500 receives packets of data, each of which may employ an Internet Protocol ("IP") format. Each IP packet of data comprises a header containing source and destination identifiers, as well as a data portion.

The source identifier identifies the source or origin of the packet of data, while the destination identifies the intended destination of the specific packet. The data portion of the packet contains the data to be conveyed from the source to the destination. Using converter 500, each packet of data may be "colored" according to its destination. More specifically, an appropriate wavelength or color of light is selected for each packet of data to enable its transport through an optical frequency router to a desired output port.

Converter 500 comprises a tunable transmitter 515 and a modulator 520. Tunable transmitter 515 may be realized by various components including a tunable laser. Upon determining the destination of each packet of data and selecting an appropriate color, tunable transmitter 515 is tuned to the appropriate color and the packet of data may be modulated by modulator 520 into an optical packet signal of the designated appropriate color. The resultant colored optical packet of data is thereafter output to a combiner, as detailed hereinabove.

The selection of an appropriate color for each packet of data in view of its destination is controlled by central scheduler 525. Central scheduler 525 protects against data collisions if two packets of data within two converters of an input device, $110_1$ of FIG. 3, for example, have the same destination. In such circumstances, one packet of data may be delayed by a memory device, such as a buffer 510, before being colored.

In another embodiment of the present invention, converter 500 comprises a light detector 505, such as a photodiode, for converting an optical packet of data into an electrical representation. The resultant electrical signal may be fed into a buffer 510 for temporary storage. Buffer 510 relays the electrical signal to modulator 520, in response to scheduler 525, to enable the carrier light beam from laser 515 to be modulated.

Figure 8:
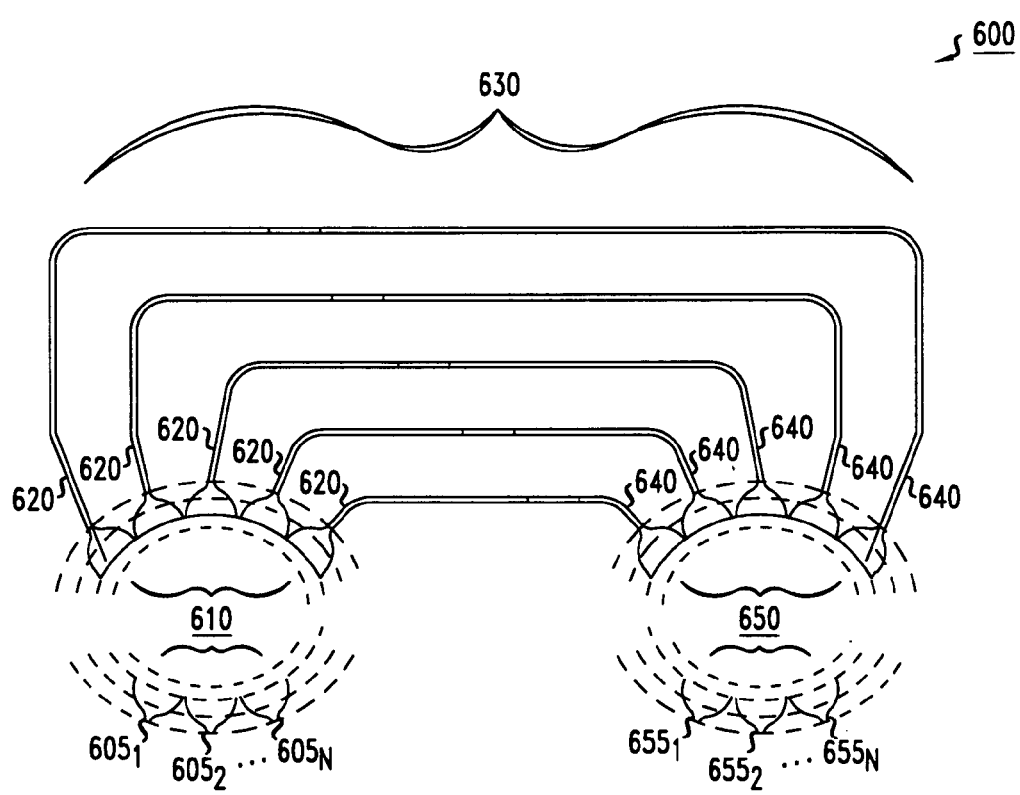
FIG. 8 illustrates an optical frequency router device according to an embodiment of the present invention.

Referring to FIG. 8, an optical frequency router 600 is illustrated as employed in the present invention. Optical frequency router 600 is a class of electro-optical components proposed for routing optical signals. Various realizations are available presently, including a Waveguide Grating Router ("WGR"), as is disclosed in U.S. Pat. Nos. 5,002,350 and 5,136,671, and hereby incorporated by reference.

Frequency router 600 comprises an interconnecting apparatus having a plurality of input ports, $605_1$–$605_N$, each of which are connected to a free space region 610. Frequency router 600 further comprises a plurality of output waveguides 620 extending from free space region 610. Each output waveguides 620 of the plurality is coupled with an optical grating 630. Optical grating 630 comprises a plurality of unequal length waveguides. The differing lengths of these waveguides cause distinct relative phase delays between optical signals propagating through optical grating 630. Each waveguide of the plurality of unequal length waveguides is coupled with an input waveguide of a plurality of input waveguide 640. Each input waveguide is connected to a second free space region 650. Extending from second free space region 650 is a plurality of output ports, $655_1$–$655_N$. Typically, input and output ports, $605_1$–$605_N$ and $655_1$–$655_N$, are respectively formed from waveguides.

It should be apparent to skilled artisans that frequency router 600 may operate as a multiplexer and/or a demultiplexer of optical frequencies. Thus, if an optical signal having an amplitude A is received by input port $605_1$, a number of optical signals are produced at the output ports $655_1$–$655_N$. The optical signals at the output ports $655_1$–$655_N$ have corresponding amplitudes of $AT_1, AT_2, AT_N$, where $T_i$ is the value of the transmission coefficient for input port $605_1$ and each output port $655_1$–$655_N$. Furthermore, from these properties, frequency router 600 may direct an optical signal received by an input port, $605_1$–$605_N$, into an output port, $655_1$–$655_N$, in response to its wavelength or color. While the particular invention has been described with reference to illustrative embodiments, this description is not meant to be construed in a limiting sense. It is understood that although the present invention has been described, various modifications of the illustrative embodiments, as well as additional embodiments of the invention, will be apparent to skilled artisans upon reference to this description without departing from the spirit of the invention, as recited in the claims appended hereto. It is therefore contemplated that the appended claims will cover any such modifications or embodiments as fall within the true scope of the invention.

The invention claimed is:

1. A dynamic optical router for routing optical signals to a plurality of output channels, comprising at least one frequency router having a plurality of input ports and a plurality of output ports, each optical signal comprising destination information, at least one input port simultaneously receives at least two optical signals to be frequency routed, at least one output port simultaneously presents at least two frequency routed optical signals, and at least one output port couples routed optical signals to a plurality of output channels, wherein each optical signal to be frequency routed is dynamically tuned to a particular color in response to its destination information.

2. The optical router of claim 1, further comprising:
   a plurality of combiners, one combiner for combining the at least two optical signals to be routed; and
   a plurality of receivers, one receiver for separating each of the at least two routed optical signals to intended destinations in response to destination information.

3. The optical router of claim 2, wherein the frequency router routes optical signals by color, the at least two optical signals to be routed having different colors, and the at least two routed optical signals having different colors.

4. The optical router of claim 3, wherein the optical router receives packets of data, each packet of data having destination information, each combiner coupled with at least one converter of a plurality, each converter converting at least one packet of data to an optical signal colored in response to the destination information of the corresponding at least one packet of data.

5. The optical router of claim 4, wherein the frequency router comprises:
   at least one input waveguide;
   at least one output waveguide;
   a first and a second free space region, the first free space region coupled with the at least one input waveguide and the second free space region coupled with the at least one output waveguide; and an optical grating having a plurality of unequal length waveguides, each unequal length waveguide coupled between the first free space region and the second free space region.

6. The optical router of claim 5, wherein each receiver comprises:
   at least two tunable filters; and
   at least one splitter for splitting the at least two routed optical signals between the at least two tunable filters such that at least one of the at least two tunable filters is tuned to pass one of the at least two routed optical signals to an intended destination.

7. The optical router of claim 5, wherein each receiver comprises:
   at least two second stage converters;
   at least one demultiplexer for separating each of the at least two routed optical signals into one of the at least two second stage converters, each second stage converter converting one of the routed optical signals to a second stage optical signal colored in response to the destination information of the corresponding at least one packet of data; and
   at least one second stage combiner for combining second stage optical signals into a combined second stage optical signal to be frequency routed.

8. The optical router of claim 7, further comprising:
   a second stage frequency router having a plurality of second stage input ports and a plurality of second stage output ports, one second stage input port receiving the combined second stage optical signal to be frequency routed; and
   a plurality of output stage demultiplexers, each output stage demultiplexer being coupled one second stage output port of the second stage frequency router such that each second stage optical signal of the combined routed second stage optical signal is presented to an intended destination.

9. A dynamic optical router for routing a plurality of packets, N, of data to a plurality of output channels, each packet of data having destination information, the optical router comprising:
   a plurality of converters, each converter receiving a packet of data and providing an optical signal to be combined and routed, each optical signal being colored in response to the destination information of the respective packet of data;
   a plurality of combiners, one combiner combining at least two optical signals to be routed;
   at least one frequency router having a plurality of input ports, M, and a plurality of output ports, M, at least one output port simultaneously receiving the at least two optical signals to be routed, at least one output port simultaneously presenting at least two routed optical signals, and at least one output port coupling routed optical signals to a plurality of output channels, the at least one frequency router routing optical signals by color dynamically in response to said destination information;
   a plurality of receivers having a plurality of outputs corresponding to said output channels, which in turn correspond to intended destinations; and
   a plurality of splitters, one splitter splitting the at least two routed optical signals along separate optical paths toward at least two output channels, a receiver in one of the paths being tuned to pass one of the at least two routed optical signals to an intended destination.

10. The optical router of claim 9, wherein each converter comprise a tunable light source for generating one optical signal, and for coloring the one optical signal in response to the destination information of the respective packet of data, and wherein each receiver comprises a tunable filter for tuning to a color to pass one of the at least two routed optical signals to an intended destination.

11. The optical router of claim 10, wherein each converter comprises a converter for converting at least one packet of data to the one optical signal colored in response to destination information, and wherein each receiver comprises a converter for converting a routed optical signal into a routed packet of data.

12. The optical router of claim 11, further comprising a scheduler for scheduling the conversion each packet of data into an optical signal and for scheduling the tuning of the tunable filter.

13. The optical router of claim 11, wherein the frequency router comprises:
   at least one input waveguide;
   at least one output waveguide;
   a first and a second free space region, the first free space region coupled with the at least one input waveguide and the second free space region coupled with the at least one output waveguide; and
   an optical grating having a plurality of unequal length waveguides, each unequal length waveguide coupled between the first free space region and the second free space region.

14. A dynamic optical router for routing a plurality of packets, N, of data to a plurality of output channels, each packet of data having destination information, the optical router comprising:
   a plurality of first stage converters, each converter receiving a packet of data and providing an optical signal to be combined and routed, each optical signal being colored in response to the destination information of the respective packet of data;
   a plurality of first stage combiners, one combiner combining at least two optical signals to be routed;
   a first stage frequency router having a plurality of input ports, M, and a plurality of output ports, M, at least one input port simultaneously receiving the combined at least two optical signals to be routed, at least one output port simultaneously presenting at least two first stage routed optical signals and at least one output port coupling routed optical signals to a plurality of output channels, the first stage frequency router routing optical signals by color dynamically in response to said destination information;
   a plurality of second stage converters, each second stage converter providing a second stage optical signal to be combined and routed, each second stage optical signal being colored in response to the destination information of the respective packet of data; and each second stage converter including a buffer that delays selected packets based on the destination information;
   a plurality of second stage demultiplexers, one second stage demultiplexer presenting each of the at least two routed optical signals from the first stage frequency router to a second stage converter;
   a plurality of second stage combiners, one second stage combiner combining at least two second stage optical signals to be routed; and
   a second stage frequency router having a plurality of second stage input ports, M, and a plurality of second stage output ports, M, at least one second stage input port simultaneously receiving at least two second stage optical signals to be routed, at least one second stage output port simultaneously presenting at least two second stage routed optical signals, and at least one output port coupling routed optical signals to a plurality of output channels, the second stage frequency router routing second stage optical signals by color dynamically in response to said destination information.

15. The optical router of claim 14, further comprising a plurality of output stage receivers, each output stage receiver having an output stage demultiplexer, one output stage demultiplexer presenting each of the at least two second stage routed optical signals from the second stage frequency router to an intended destination.

16. The optical router of claim 14, further comprising a plurality of output stage receivers, each output stage receiver comprising:
   at least two tunable filters for tuning to a color; and
   a splitter coupled with the at least two tunable filters, wherein one output stage receiver splits the at least two second stage routed optical signals between the corresponding at least two tunable filters such that at least one of the at least two tunable filters is tuned to pass one of the at least two second stage routed optical signals to an intended destination.

17. The optical router of claim 14, wherein each first stage converter comprises a first stage tunable light source for generating one optical signal, and for coloring the one optical signal in response to the destination information of the respective packet of data, each second stage converter comprises a second stage tunable light source for generating one second stage optical signal, and for coloring the one second stage optical signal in response to the destination information of the respective packet of data, and further comprising a scheduler for scheduling the coloring of each optical signal and each second stage optical signal.

18. The optical router of claim 17, wherein each first stage converter comprises a first stage converter for converting at least one packet of data to the one optical signal colored in response to destination information of the respective packet of data, each second stage converter comprises a second stage converter for coloring one second stage optical signal in response to destination information of the respective packet of data.

19. The optical router of claim 14, wherein at least one of the first and the second stage frequency routers comprise:
   at least one input waveguide;
   at least one output waveguide;
   a first and a second free space region, the first free space region coupled with the at least one input waveguide and the second free space region coupled with the at least one output waveguide; and
   an optical grating having a plurality of unequal length waveguides, each unequal length waveguide coupled between the first free space region and the second free space region.

20. The optical router of claim 14, wherein each second stage converter, in response to destination information, re-colors the optical signals that are received thereby.

21. A method for routing optical signals to a plurality of output channels comprising:

determining a first, second and third destination for a first, second and third packet of data, respectively;
generating a first, second and third carrier signal having a first, second and third frequency associated with the first, second and third destinations, respectively;
modulating the first, second and third carrier signals in response to the first, second and third packets of data to form a first, second and third optical signal; and
routing the first, second and third optical signals by a frequency routing device, routing comprising:
   simultaneously receiving in a first input of a frequency router at least two of the first, second and third signals;
   simultaneously presenting from a first output of the frequency router at least two of the first, second and third routed optical signals; and coupling routed optical signals from at least one output port to a plurality of output channels.

22. A method for routing a plurality of optical signals to a plurality of output channels as a function of color through a router having a plurality of input ports and a plurality of output ports, the method comprising the steps of:
   simultaneously receiving at at least one of the input ports at least two optical signals respectively colored as a function of destination information contained therein;
   simultaneously presenting to at least one of the output ports at least two optical signals routed as a function of their color; and coupling routed optical signals from at least one output port to a plurality of output channels.

23. The method of claim 22, after the presenting step further comprising the step of processing each of the presented at least two routed optical signals from the at least one of the output ports.

24. The method of claim 22, further comprising the step of coloring each optical signal of the plurality as a further function of which input port of the plurality of input ports it is applied to.

25. A method for use in conjunction with a router which has a plurality of input ports and plurality of output ports, said router being of a type which routes optical signals applied to its input ports to particular ones of said output ports as a function of the respective colors of said optical signals, the method:
   applying each of a plurality of optical signals to a respective one of the input ports, this including the step of concurrently applying to an individual one of said input ports at least two optical signals which have been respectively colored as a function of destination information contained in said optical signals, at least two of said optical signals being concurrently routed to a particular one of said output ports.

26. The invention of claim 25, comprising the further step of concurrently removing from said particular one of said output ports said two optical signals concurrently routed thereto.

27. The invention of claim 25, wherein the coloring of each said optical signal is a further function of which input port it is applied to.

* * * * *